United States Patent
Lin et al.

(10) Patent No.: US 9,973,350 B2
(45) Date of Patent: May 15, 2018

(54) METHOD FOR NETWORK SHARING OF MULTIPLE NETWORK OPERATORS AND NETWORK SHARING MANAGEMENT PROXY DEVICE USING THE SAME

(71) Applicant: INDUSTRIAL TECHNOLOGY RESEARCH INSTITUTE, Hsinchu (TW)

(72) Inventors: Ying-Dar Lin, Taipei (TW); Hsien-Wen Chang, Hsinchu (TW); Kun-Yi Lin, Taichung (TW); Chia-Lin Lai, Tainan (TW); Hsu-Tung Chien, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 220 days.

(21) Appl. No.: 14/982,940

(22) Filed: Dec. 29, 2015

(65) Prior Publication Data
US 2016/0353359 A1 Dec. 1, 2016

Related U.S. Application Data

(60) Provisional application No. 62/167,315, filed on May 28, 2015.

(30) Foreign Application Priority Data

Dec. 21, 2015 (TW) .............................. 104142987 A (51) Int. Cl.
*H04W 4/00* (2018.01)
*H04L 12/46* (2006.01)
*H04W 88/10* (2009.01)

(52) U.S. Cl.
CPC ......... *H04L 12/4633* (2013.01); *H04W 88/10* (2013.01)

(58) Field of Classification Search
None
See application file for complete search history.

(56) References Cited

U.S. PATENT DOCUMENTS 8,620,383 B2 12/2013 Panchal et al.
2010/0309894 A1* 12/2010 Csaszar .............. H04L 12/4633
370/338

(Continued)

FOREIGN PATENT DOCUMENTS

| CN | 102958094 A | 3/2013 |
| TW | 200942052 A1 | 10/2009 |
| TW | 201503732 A | 1/2015 |

OTHER PUBLICATIONS

Taiwanese Office Action and Search Report, dated Apr. 27, 2017, for Taiwanese Application No. 104142987.

(Continued)

Primary Examiner — Chi H Pham
Assistant Examiner — Fahmida Chowdhury
(74) Attorney, Agent, or Firm — Birch, Stewart, Kolasch & Birch, LLP (57) ABSTRACT

A method for network sharing of multiple network operators includes steps of: providing a network sharing management proxy device adapted to be disposed between a sharing access point (AP) and a plurality of core networks of the network operators, wherein the sharing AP allows one or more end user equipment (UE) of the network operators to access; receiving a control message by the network sharing management proxy device, wherein the control message is corresponding to an UE, and the UE is an end UE of a first network operator of the network operators; checking the control message to determine that the UE is corresponding to which one of the network operators, and generating tunneling information accordingly; and transmitting the con- (Continued)

trol message to a first core network of the first network operator according to the tunneling information.

16 Claims, 10 Drawing Sheets

(56) References Cited

U.S. PATENT DOCUMENTS

| | | | |
|---|---|---|---|
| 2012/0157095 A1 | 6/2012 | Fodor et al. | |
| 2012/0178466 A1* | 7/2012 | You | H04W 60/00 455/450 |
| 2013/0178225 A1 | 7/2013 | Xing | |
| 2013/0237239 A1 | 9/2013 | Mahindra et al. | |
| 2013/0265997 A1* | 10/2013 | Gu | H04W 36/0022 370/338 |
| 2013/0267203 A1* | 10/2013 | Qiang | H04W 48/18 455/411 |
| 2013/0303088 A1 | 11/2013 | Watfa et al. | |
| 2013/0303114 A1 | 11/2013 | Ahmad et al. | |
| 2014/0038611 A1 | 2/2014 | Wong et al. | |
| 2014/0051443 A1* | 2/2014 | Diachina | H04W 36/0022 455/436 |
| 2014/0056290 A1* | 2/2014 | Pazhyannur | H04W 4/00 370/338 |
| 2014/0133456 A1* | 5/2014 | Donepudi | H04W 88/10 370/331 |
| 2014/0146780 A1* | 5/2014 | Mildh | H04W 12/08 370/329 |

OTHER PUBLICATIONS

Andrews et al., "Autonomous Spectrum Sharing For mixed LTE Femto and Macro Cells Deployments", IEEE, 2010, This full text paper was peer reviewed at the direction of IEEE Communications Society subject matter experts for publication in the IEEE INFOCOM 2010 proceedings, 5 pages.

Khan et al., "Network Sharing in the Next Mobile Network: TCO Reduction, Management Flexibility, and Operational Independence", Traffic Management For Mobile Broadband Networks, IEEE Communications Magazine, Oct. 2011, pp. 134-142.

Kokku et al., "CellSlice: Cellular Wireless Resource Slicing for Active RAN Sharing", IEEE 2013, 10 pages.

Mahindra et al., "Radio Access Network Sharing in Cellular Networks", IEEE 2013, 10 pages.

Meddour et al., "On the role of infrastructure sharing for mobile network operators in emerging markets", Elsevier, Computer Networks, 2011, vol. 55, pp. 1576-1591.

Wang et al., "Based Multi-Operator Shared Network Opportunistic Spectrum Sharing", IEEE 2012, Proceedings of IEEE CCIS2012, pp. 864-868.

\* cited by examiner

METHOD FOR NETWORK SHARING OF MULTIPLE NETWORK OPERATORS AND NETWORK SHARING MANAGEMENT PROXY DEVICE USING THE SAME

CROSS-REFERENCE TO RELATED APPLICATION

This application claims the benefits of U.S. provisional application Ser. No. 62/167,315, filed May 28, 2015, and Taiwan application Serial No. 104142987, filed Dec. 21, 2015, the disclosure of which are incorporated by reference herein in its entirety.

TECHNICAL FIELD

The disclosure relates in general to a communication method and an electric device using the same, and relates to a method for network sharing of the multiple network operators and a network sharing management proxy device using the same.

BACKGROUND

How to improve the network transmission rate is an issue to be addressed in communication field. In indoor situations, e.g., public transportation or offices, it can typically deploy a small base station to improve the quality of signals for users and to extend the network coverage. However, in order to support the accesses of various network operators' end users, it is required for the network operators to deploy their own small base station in a limited space to serve the users, but this will significantly increase the cost of deployment and the difficulty of installation.

Therefore, there is a need to provide a communication method capable of supporting network sharing of multiple network operators.

SUMMARY

The disclosure is directed to a method for network sharing of the multiple network operators and a network sharing management proxy device using the same.

According to one embodiment, a method for network sharing of multiple network operators is provided. The method includes steps of: providing a network sharing management proxy device adapted to be disposed between a sharing access point (AP) and a plurality of core networks of the network operators, wherein the sharing AP allows one or more end user equipment (UE) of the network operators to access; receiving a control message by the network sharing management proxy device, wherein the control message is corresponding to a UE, and the UE is an end UE of a first network operator of the network operators; checking the control message to determine that the UE is corresponding to which one of the network operators, and generating tunneling information accordingly; and transmitting the control message to a first core network of the first network operator according to the tunneling information.

According to another embodiment, a network sharing management proxy device for network sharing of multiple network operators is provided. The network sharing management proxy device includes a receiving circuit, a processing circuit and a transmitting circuit. The receiving circuit is for receiving a control message corresponding to a user equipment (UE), wherein the UE is an end UE of a first network operator of the network operators. The processing circuit is for checking the control message to determine that the UE is corresponding to which one of the network operators, and generating tunneling information accordingly. The transmitting circuit is for transmitting the control message to a first core network of the first network operator according to the tunneling information; wherein the network sharing management proxy device is adapted to be disposed between a sharing access point (AP) and a plurality of core networks of the network operators, and the sharing AP allows one or more end UE of the network operators to access.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

A number of embodiments of the present invention are disclosed below with reference to accompanying drawings, but not every embodiment is illustrated in accompanying drawings. In practical application, the present invention can have different variations and is not limited to the embodiments exemplified in the specification. A number of embodiments are disclosed in the present disclosure to meet the statutory requirements. Designations common to the accompanying drawings are used to indicate identical or similar elements.

Figure 1:
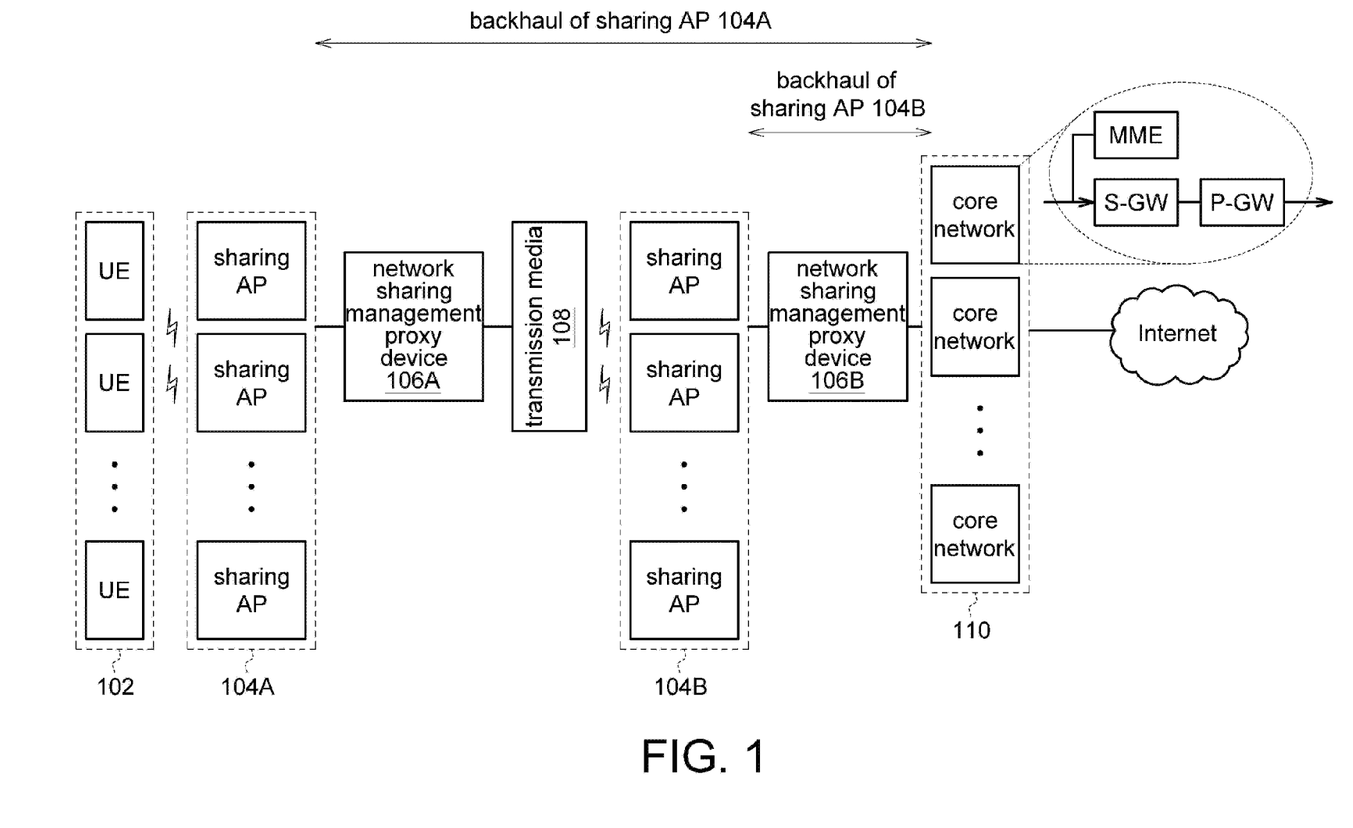
FIG. 1 shows a schematic diagram of a communication system according to an embodiment of the present invention.

FIG. 1 shows a schematic diagram of a communication system 100 according to an embodiment of the present invention. The communication system 100 includes one or more user equipment (UE) 102, sharing access points (AP) 104A/104B, network sharing management proxy devices 106A/106B in backhaul, a transmission media 108 and one or more core networks 110 of various network operators.

The UE 102 can be, for example, an end UE for the network operators. The sharing AP 104A/104B, e.g., a small cell/macro cell, allows one or more end UE belonging to different network operators to access. Foe example, provided that the sharing AP 104A/104B is shared by a first network operator and a second network operator, the sharing AP 104A/104B may connect to the end UE of the first and second network operators to perform relative communication. The network sharing management proxy device 106A/106B, e.g., a Mobility Management Entity (MME) proxy device, can be realized by such a personal computer (PC), a laptop, or a circuit which reads at least a readable code from at least a memory device. Below, the proposed network sharing management proxy device 106A/106B is exemplified as an MME proxy device under Long Term Evolution (LTE) environment, but the present disclosure is not limited thereto.

The transmission media 108 which can be realized by such as a wired network or a wireless network is responsible for the signal transmission of the backhaul of the sharing AP 104A. The backhaul of the sharing AP 104B may connect to the one or more core networks 110 of the network operators through the network sharing management proxy device 106B. Take FIG. 1 for example, provided that the transmission media 108 is realized by a wireless transceiver, the transmission media 108 is like the UE 102 which can be provided by the various network operators, and thus can connect to the sharing AP 104B. The plurality of core networks 110 can be deployed by the various network operators for example, and each core network 110 may include network components such as MME, Serving Gateway (S-GW) and Packet Data Network Gateway (P-GW). The MME is responsible for processing control-related messages. The S-GW and P-GW may deliver data packet(s) to the Internet.

In the embodiments of the present disclosure, the network sharing management proxy device is adapted to be disposed between the sharing AP 104A/104B and the core networks of the various network operators. Control messages corresponding to the various network operators' UE can be transmitted to the network sharing management proxy device through the sharing AP shared by the various network operators. The network sharing management proxy device may executes the functionality of tunneling, by adding corresponding tunneling information into the control message, to protect and to transmit the control message to the target core network. Accordingly, the proposed network sharing management proxy device not only realizes the sharing of small cell/macro cell for multiple network operators, but also makes the various network operators share their backhaul resources. Thus, the cost of deploying the small cell/macro cell to the network operators can be reduced, and the available bandwidth for the user can be improved.

In an embodiment, as shown in FIG. 1, the network sharing management proxy device 106A is adapted to be disposed in the backhaul of the sharing AP 104A. The network sharing management proxy device 106A disposed in the backhaul of the sharing AP 104A may forward the control messages received from the sharing AP 104A to the transmission media 108, and utilize the transmission media 108 to pass the control messages to the core network(s) 110 in the backhaul.

In an embodiment, depending on various applications, the network sharing management proxy device (e.g., the network sharing management proxy device 106B) is adapted to be disposed in the backhaul of the sharing AP 104B shown in FIG. 1. The network sharing management proxy device 106B disposed in the backhaul of the sharing AP 104B may receive the control messages from the transmission media 108, and transmit the control messages to the target core network through at least one of the core networks 110.

The control message may include registration information of the UE which can be delivered to the target core network through at least one of the core networks 110 in a form of data packet. For example, provided that the UE 102 is an end UE of the first network operator and registers to a first core network of the first network operator, the control message (e.g., including the information of network registration) from the UE 102 can be encapsulated into data packets and be delivered by the core network(s) of the first network operator or other network operator(s) (e.g., a second core network). The delivered data packets can be sent back from Internet to the target core network (e.g., the first core network) for related registration procedures. In an embodiment, the network sharing management proxy device may select, according to the network conditions and/or routing rules, one of the core networks 110 provided by the various network operators to deliver the control message to the target core network.

Figure 2:
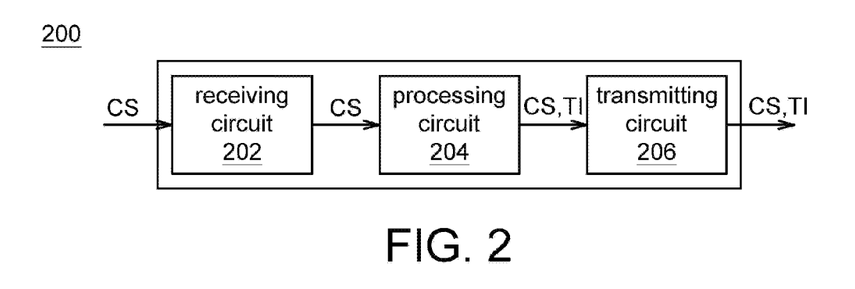
FIG. 2 shows a simplified block diagram of a network sharing management proxy device according to an embodiment of the present disclosure.
Figure 3:
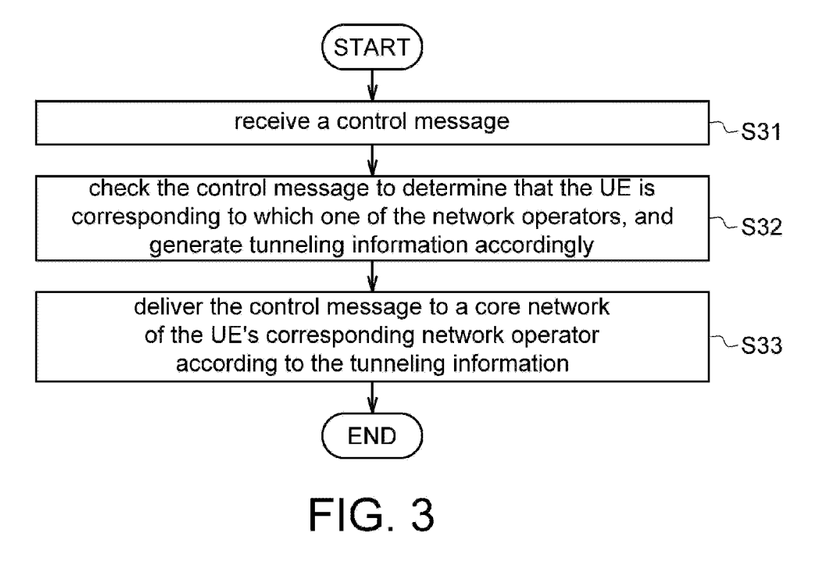
FIG. 3 shows a flowchart of a communication method of the network sharing management proxy device.

Refer to FIG. 2 and FIG. 3. FIG. 2 shows a simplified block diagram of a network sharing management proxy device 200 according to an embodiment of the present disclosure. FIG. 3 shows a flowchart of a communication method of the network sharing management proxy device 200. The network sharing management proxy device 200 can be used as the network sharing management proxy device 106A/106B in FIG. 1, or any other network sharing management proxy device described in the present disclosure.

The network sharing management proxy device 200 includes a receiving circuit 202, a processing circuit 204 and a transmitting circuit 206. The receiving circuit 202 may include a wireless receiver. The processing circuit 204 may be realized by such as a special purpose application circuit, a central processing unit, a micro processor or other arithmetic processing circuits. The transmitting circuit 206 may include a wired/wireless transmitter.

At step S31, the receiving circuit 202 receives a control message CS corresponding to a UE, wherein the UE is an end UE of a first network operator of the various network operators sharing the sharing AP.

At step S32, the processing circuit 204 checks the control message CS to determine that the UE is corresponding to which one of the network operators, and generates tunneling information TI accordingly.

At step S33, the transmitting circuit 206 delivers the control message CS to a first core network of the first network operator (i.e., a core network of the UE's corresponding network operator) according to the tunneling information TI. The tunneling information TI is corresponding to a tunnel end in the first core network. The tunnel end may process the control message CS in response to the tunneling information TI, such as forwarding the control message CS to one or more network components for network registration and/or authentication. In this manner, the UE can register to the target core network through the control message CS, and then get the Internet access functions.

As mentioned earlier, the network sharing management proxy device can be disposed in the backhaul of the sharing AP. Below, details are described in connection with the figures.

Figure 4:
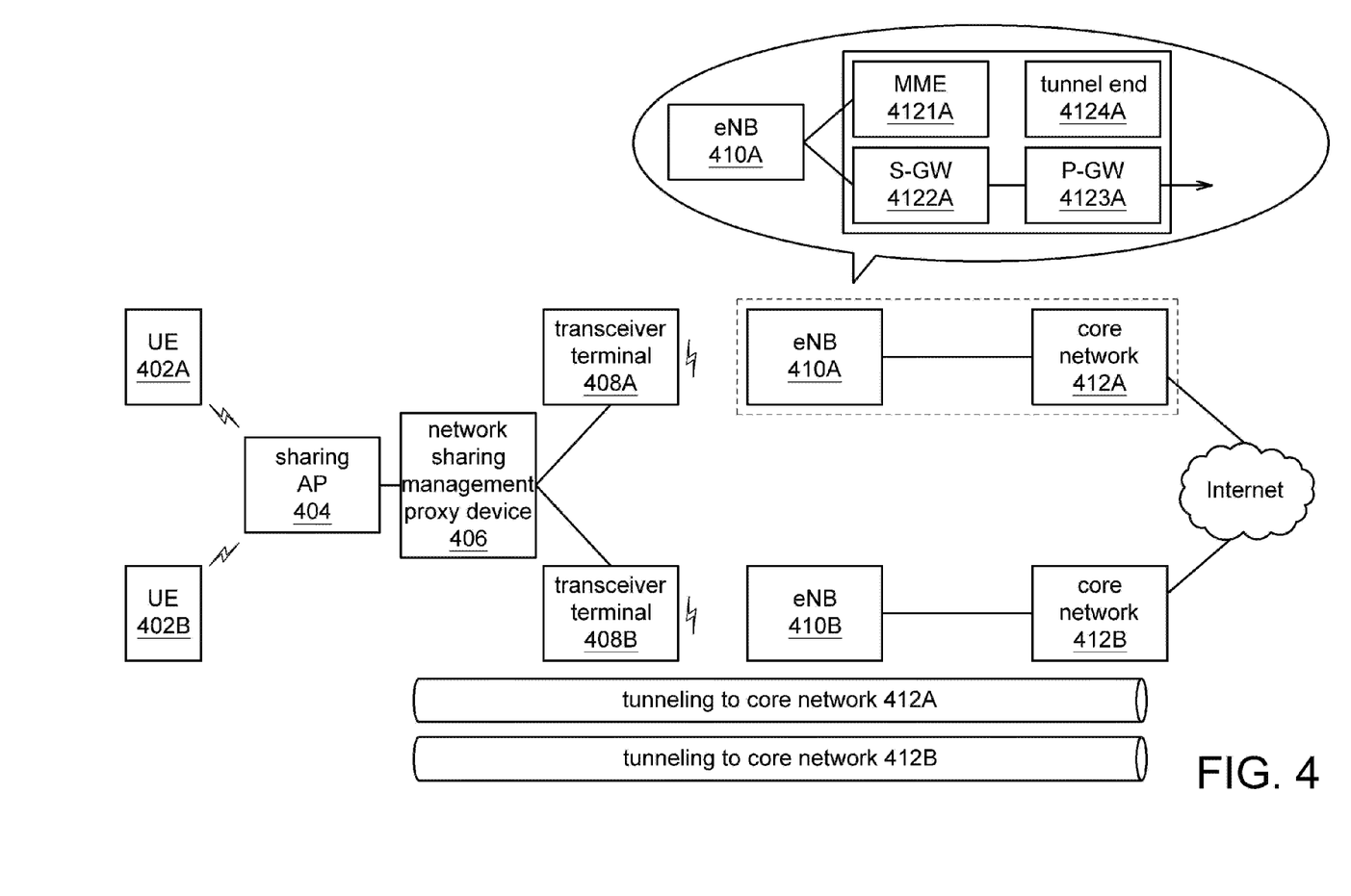
FIG. 4 shows a schematic diagram of a network configuration in which the proposed network sharing management proxy device is disposed in the backhaul.

FIG. 4 shows a schematic diagram of a network configuration in which the proposed network sharing management proxy device is disposed in the backhaul. In the example of FIG. 4, UE 402A and 402B are end UE respectively belonging to different network operators (hereafter referred to as "first network operator" and "second network operator"). Both of the first and second network operators share the sharing AP 404. Thus, the UE 402A and 402B can establish Radio Resource Control (RRC) connection to the sharing AP 404. The sharing AP 404 is connected to the network sharing management proxy device 406 (e.g., an MME proxy device) disposed in the backhaul through S1 interface, and may send the control messages of the UE 402A and 402B to the network sharing management proxy device 406. When the network sharing management proxy device 406 receives the control messages, it will pass them to the backhaul terminals, e.g., the transceiver terminals 408A and 408B shown in the figure. For example, the transceiver terminals 408A and 408B are Customer Premise Equipment (CPE), which are corresponding to the first and second network operators, respectively. The transceiver terminals 408A and 408B may encapsulate the received messages into user plane data packets, and may deliver the data packets to the corresponding Radio Access Network (RAN). For example, if the transceiver terminal 408A is selected to deliver the data packets, the eNB 410A corresponding to the first network operator will be used to receive the packets. Alternatively, if the transceiver terminal 408B is selected to deliver the data packets, the eNB 410B corresponding to the second network operator will be used to receive the packets. After that, the data packets will arrive at the corresponding core network (e.g., the core network 412A corresponding to the first network operator, or the core network 412B corresponding to the second network operator), and then be forward to the target core network for registration.

For example, if the control messages of the UE 402A/402B are delivered by the transceiver terminal 408A of the first network operator, the corresponding eNB 410A at the receiving side will transmit the control messages encapsulated in data packets to the S-GW 4122A of the core network 412A, and forwards them to Internet through the P-GW 4123A. The relative data packets are then sent back from Internet to the corresponding core networks for authentication and registration. The registration result will follow the same data path but reverse direction to reach the UE 402A/402B.

The network sharing management proxy device 406 may tunnel to the core networks (e.g., 412A and 412B) of various network operators. For example, each core network may include a tunnel end. When the data packets reaches the corresponding core network, the tunnel end (e.g., 4124A) may resolve the tunneling information to deal with the control messages of corresponding end UE. This establishes a tunneling connection between the network sharing management proxy device 406 and the tunnel end.

Figure 5:
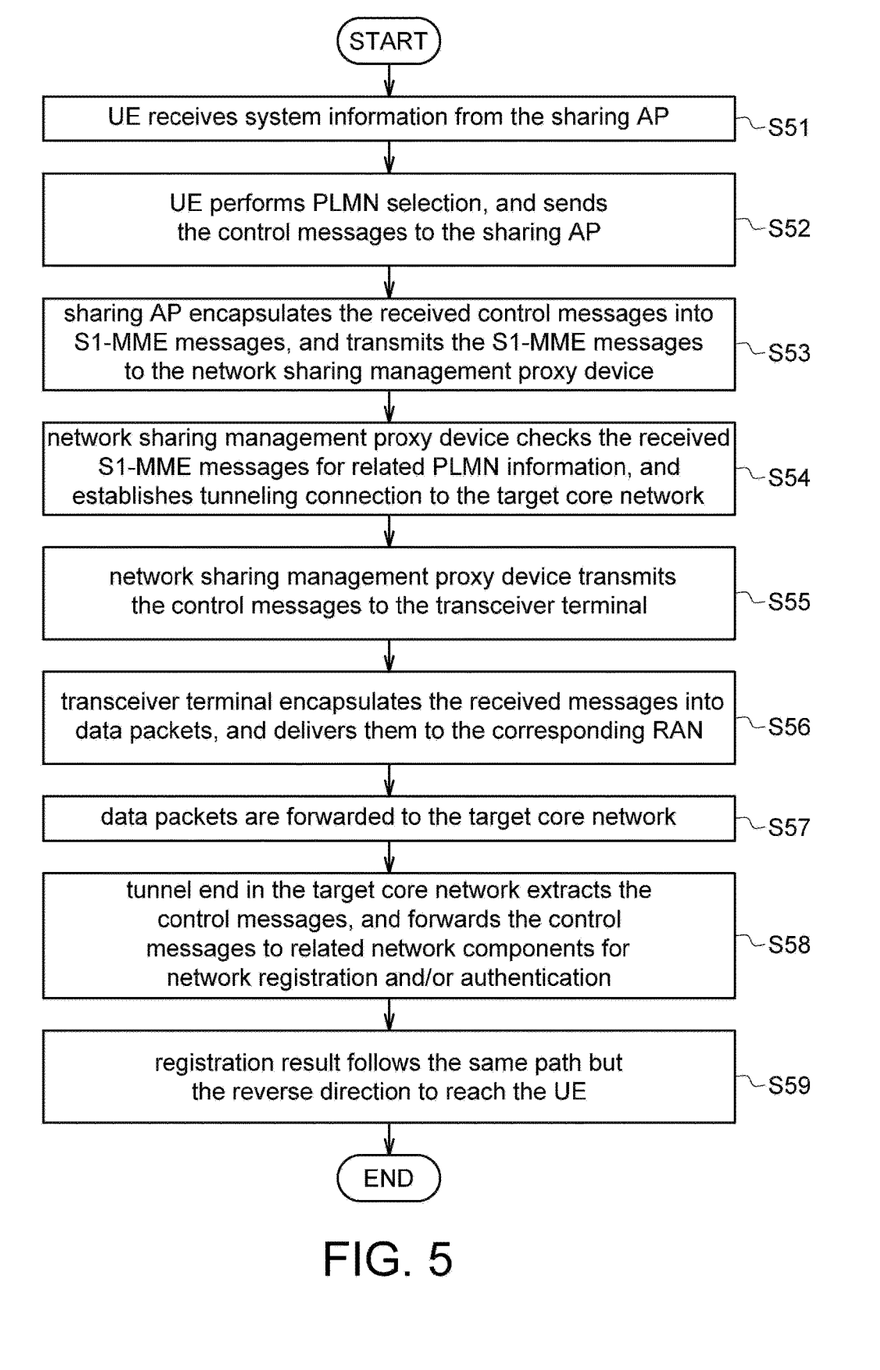
FIG. 5 shows a flowchart of a communication method based on the network configuration of FIG. 4.

FIG. 5 shows a flowchart of a communication method based on the network configuration of FIG. 4. At step S51, the UE 402A/402B receives system information from the sharing AP 404. The system information comprises, for example, a Public Land Mobile Network (PLMN) list including a plurality of IDs of the network operators sharing the sharing AP 404.

At step S52, the UE 402A/402B performs PLMN selection according to the system information, to determine whether the sharing AP 404 supports the resource sharing of the UE 402A/402B's corresponding network operator. If yes, the UE 402A/402B establishes RRC connection to the sharing AP 404, and sends the control messages to the sharing AP 404.

At step S53, the sharing AP 404 encapsulates the received control messages into S1-MME messages, and transmits the S1-MME messages to the network sharing management proxy device 406. In FIG. 4 and FIG. 5, the network sharing management proxy device is exemplified as an MME proxy device, but the present disclosure is not limited thereto.

At step S54, the network sharing management proxy device 406 checks the received S1-MME messages for related PLMN information (e.g., PLMN ID), and establishes tunneling connection to the target core network.

At step S55, the network sharing management proxy device 406 transmits the control messages to the transceiver terminal 408A/408B.

At step S56, the transceiver terminal 408A/408B encapsulates the received messages into data packets, and delivers them to the corresponding RAN.

At step S57, the data packets are forwarded to the target core network (e.g., the core network 412A/412B).

At step S58, the tunnel end in the target core network extracts the control messages, and forwards the control messages to related network components for network registration and/or authentication.

At step S59, the registration result follows the same path but the reverse direction to reach the UE 402A/402B, allowing the UE to access Internet.

Figure 6:
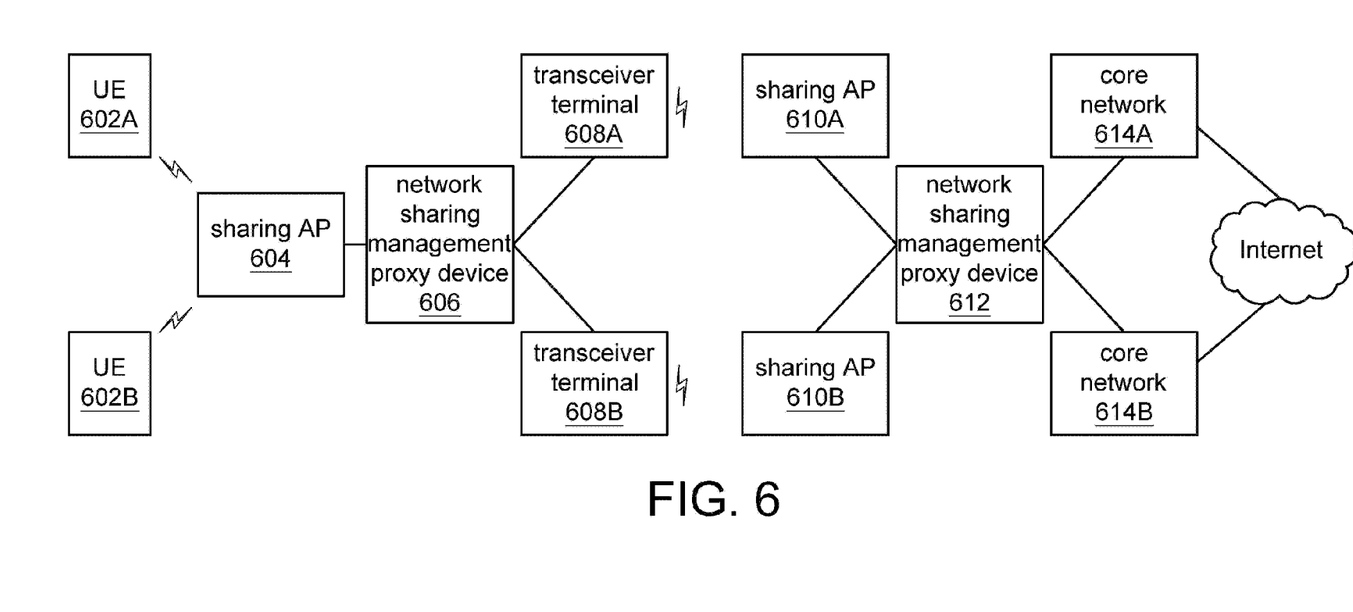
FIG. 6 shows a schematic diagram of a network configuration according to an embodiment of the present disclosure.

FIG. 6 shows a schematic diagram of a network configuration according to an embodiment of the present disclosure. In the example of FIG. 6, the UE 602A and the UE 602B are end UE of the first network operator and the second network operator, respectively. Both of the first and second network operators share the sharing AP 604. Thus, the UE 602A and 602B can build up RRC connection to the sharing AP 604. The sharing AP 604 is connected to the network sharing management proxy device 606 (e.g., an MME proxy device) through S1 interface, and may send the control messages of the UE 602A/602B to the network sharing management proxy device 606. When the network sharing management proxy device 606 receives the control messages, it will pass them to the backhaul terminals, e.g., the transceiver terminal 608A and/or 608B. Then, the control messages are transmitted to the network sharing management proxy device 612 (e.g., an MME proxy device) through the sharing AP 610A/610B.

In the embodiment, the network sharing management proxy device 606 may establish a first tunneling connection to another network sharing management proxy device 612 according to the tunneling information, and utilize the network sharing management proxy device 612 to establish a second tunneling connection to the target core network. For example, after the transceiver terminals 608A and 608B encapsulate the received control messages into data packets, these data packets will be delivered to the RAN formed by the sharing AP 610A/610B. These data packets will follow the data traffic path to reach the network sharing management proxy device 612 in the backhaul. The network sharing management proxy device 606 may generate tunneling information to build up a tunneling connection to the network sharing management proxy device 612 in the backhaul. The network sharing management proxy device 612 can resolve the tunneling information provided by the network sharing management proxy device 606 to extract the control messages, and build up a tunneling connection to the target core network 614A/614B to transmit the control messages.

Figure 7:
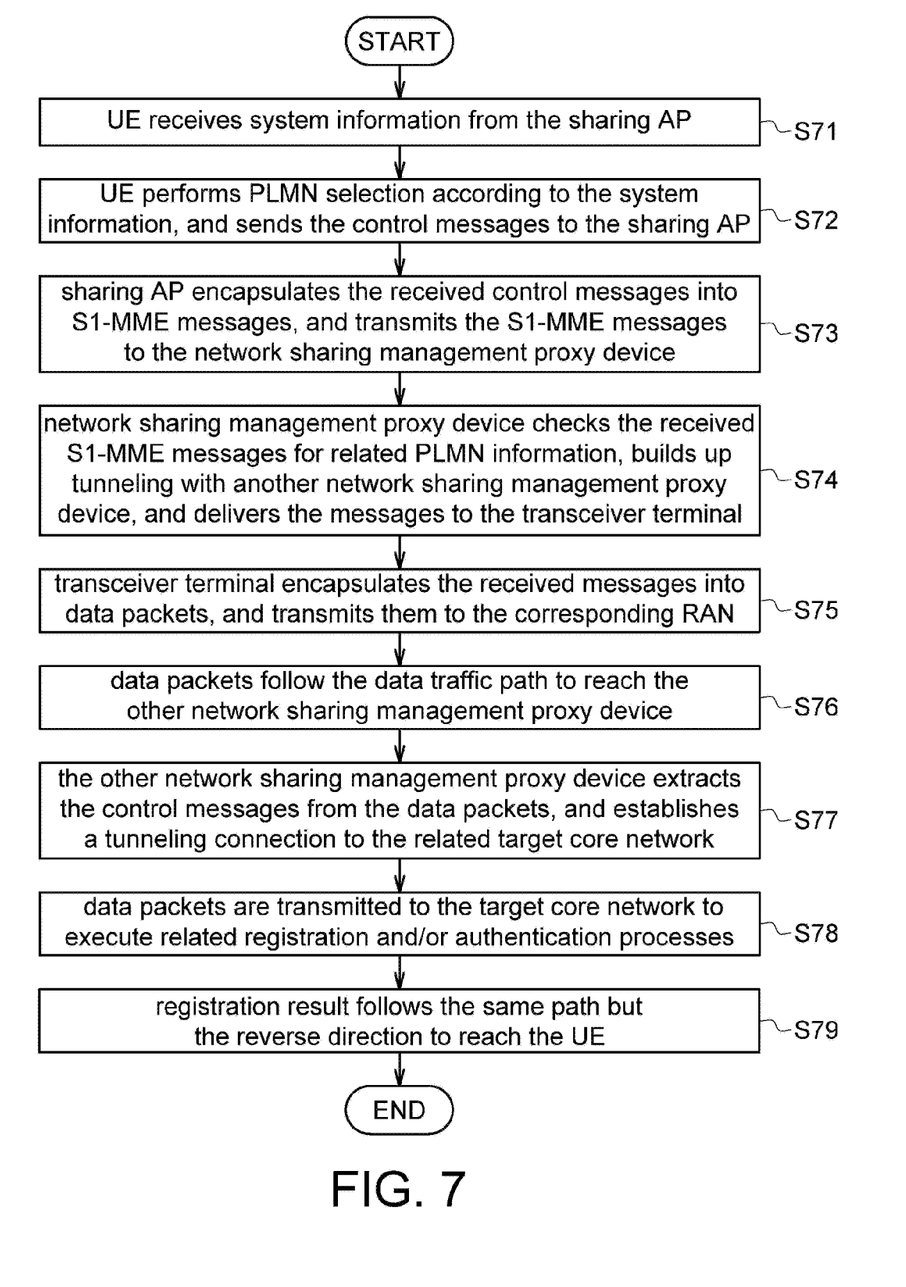
FIG. 7 shows a flowchart of a communication method based on the network configuration of FIG. 6.

FIG. 7 shows a flowchart of a communication method based on the network configuration of FIG. 6. At step S71, the UE 602A/602B receives system information from the sharing AP 604.

At step S72, the UE 602A/602B performs PLMN selection according to the system information, and establishes RRC connection to the sharing AP 604 when it is determined the sharing AP 604 can support the resource sharing of the UE 602A/602B's corresponding network operator. Then, the control messages are transmitted to the sharing AP 604.

At step S73, the sharing AP 604 encapsulates the received control messages into S1-MME messages, and transmits the S1-MME messages to the network sharing management proxy device 606.

At step S74, the network sharing management proxy device 606 checks the received S1-MME messages for related PLMN information (e.g., PLMN ID), builds up tunneling with the network sharing management proxy device 612 according to the information, and delivers the messages to the transceiver terminal 608A/608B.

At step S75, the transceiver terminal 608A/608B encapsulates the received messages into data packets, and transmits them to the RAN formed by the sharing AP 610A/610B.

At step S76, the data packets follow the data traffic path to reach the network sharing management proxy device 612.

At step S77, the network sharing management proxy device 612 extracts the control messages from the data packets, and establishes a tunneling connection to the related target core network 614A/614B.

At step S78, the data packets are transmitted to the target core network 614A/614B to execute related registration and/or authentication processes.

At step S79, the registration result follows the same path but the reverse direction to reach the UE 602A/602B. In FIG. 6 and FIG. 7, the network sharing management proxy device is exemplified as an MME proxy device, but the present disclosure is not limited thereto.

Figure 8:
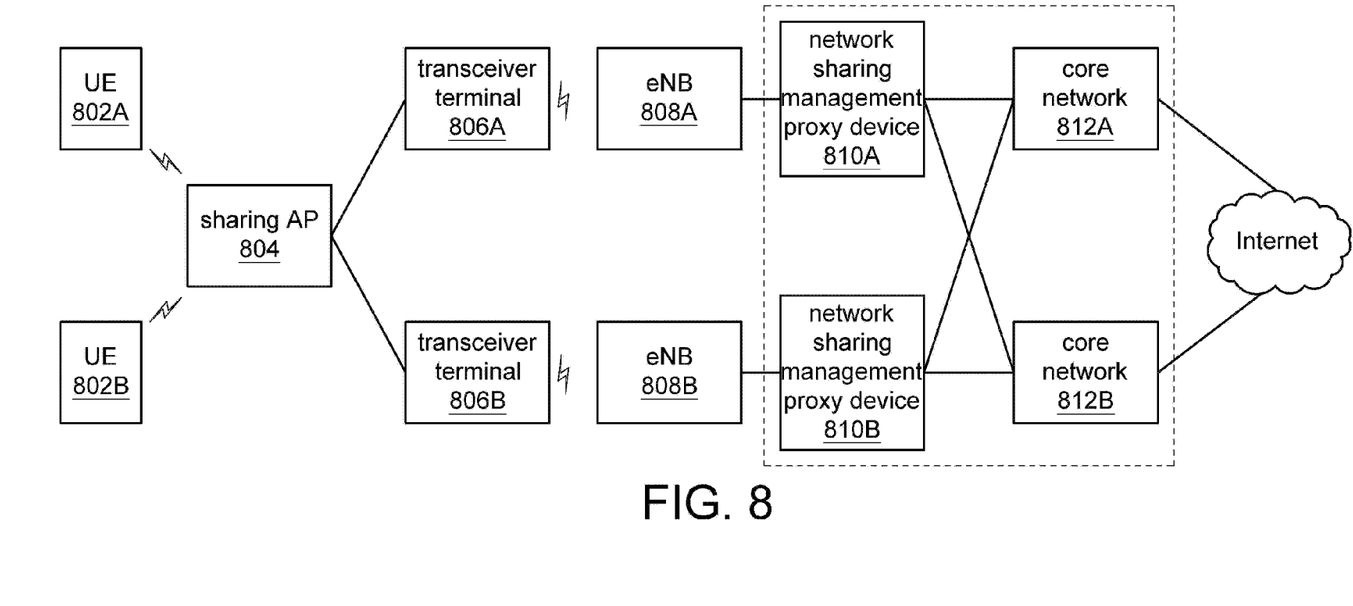
FIG. 8 shows a schematic diagram of a network configuration in which the proposed network sharing management proxy device is disposed in the backhaul.

FIG. 8 shows a schematic diagram of a network configuration in which the proposed network sharing management proxy device is disposed in the backhaul. In the example of FIG. 8, the UE 802A and the UE 802B are end UE respectively belonging to the first and second network operators. Both of the first and second network operators share the sharing AP 804. The UE 802A and 802B may establish RRC connection to the sharing AP 804. The sharing AP 804 is connected to the backhaul terminals, e.g., the transceiver terminals 806A and 806B shown in the figure. For example, the transceiver terminals 806A and 806B are CPE respectively corresponding to the first and second network operators. The transceiver terminal 806A/806B may encapsulate the received signal into data packets, and deliver them to the corresponding core network 812A/812B.

The eNBs 808A and 808B in the backhaul are respectively connected to the network sharing management proxy devices 810A and 810B. Each of the network sharing management proxy devices 810A and 810B may build up tunneling to each of the core networks 812A and 812B, to ensure that the control messages can be passed to the target core network 812A/812B finally.

Figure 9:
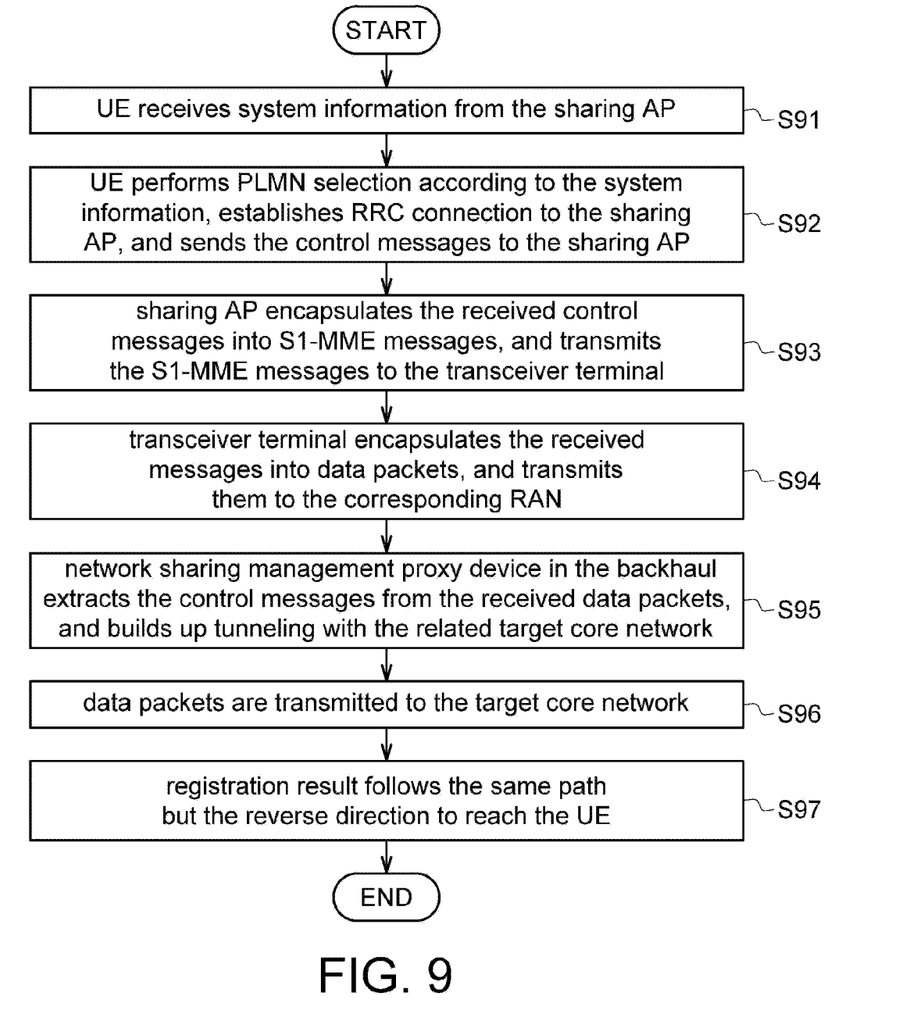
FIG. 9 shows a flowchart of a communication method based on the network configuration of FIG. 8.

FIG. 9 shows a flowchart of a communication method based on the network configuration of FIG. 8. At step S91, the UE 802A/802B receives system information from the sharing AP 804.

At step S92, the UE 802A/802B performs PLMN selection according to the system information, to determine whether the sharing AP 804 supports the resource sharing of the UE 802A/802B's corresponding network operator. If yes, the UE 802A/802B establishes RRC connection to the sharing AP 804, and sends the control messages to the sharing AP 804.

At step S93, the sharing AP 804 encapsulates the received control messages into S1-MME messages, and transmits the S1-MME messages to the transceiver terminal 806A/806B.

At step S94, the transceiver terminal 806A/806B encapsulates the received messages into data packets, and delivers them to the corresponding RAN.

At step S95, the network sharing management proxy device 810A/810B in the backhaul extracts the control messages from the received data packets, and builds up tunneling with the related target core network 812A/812B.

At step S96, the data packets are passed to the target core network 812A/812B.

At step S97, the registration result follows the same path but the reverse direction to reach the UE 802A/802B. In FIG. 8 and FIG. 9, the network sharing management proxy device is exemplified as an MME proxy device, but the present disclosure is not limited thereto.

Figure 10:
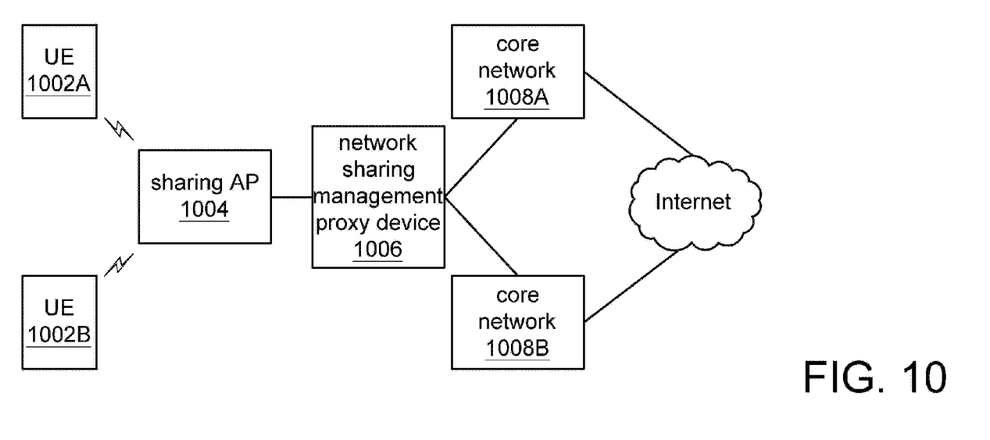
FIG. 10, FIG. 11 and FIG. 12 show schematic diagrams of various network configurations respectively corresponding to those shown in FIG. 4, FIG. 6 and FIG. 8.
Figure 11:
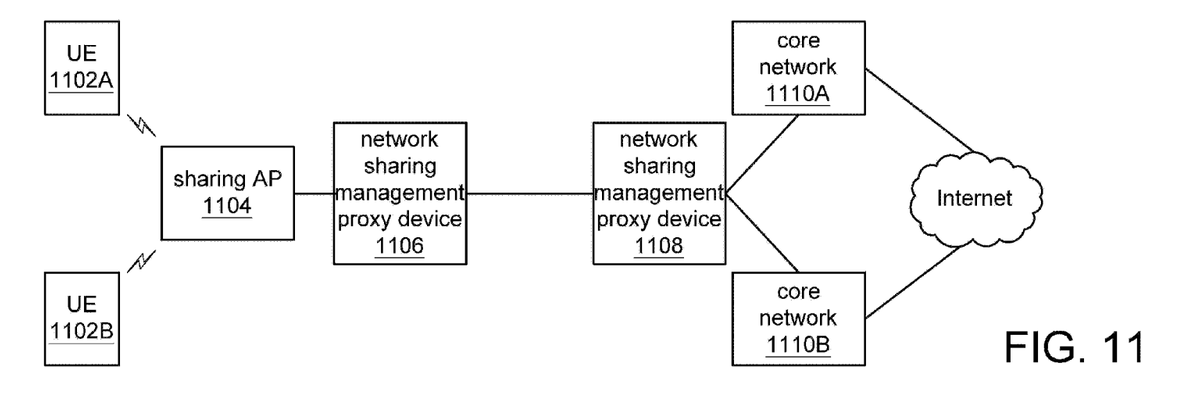
Figure 12:
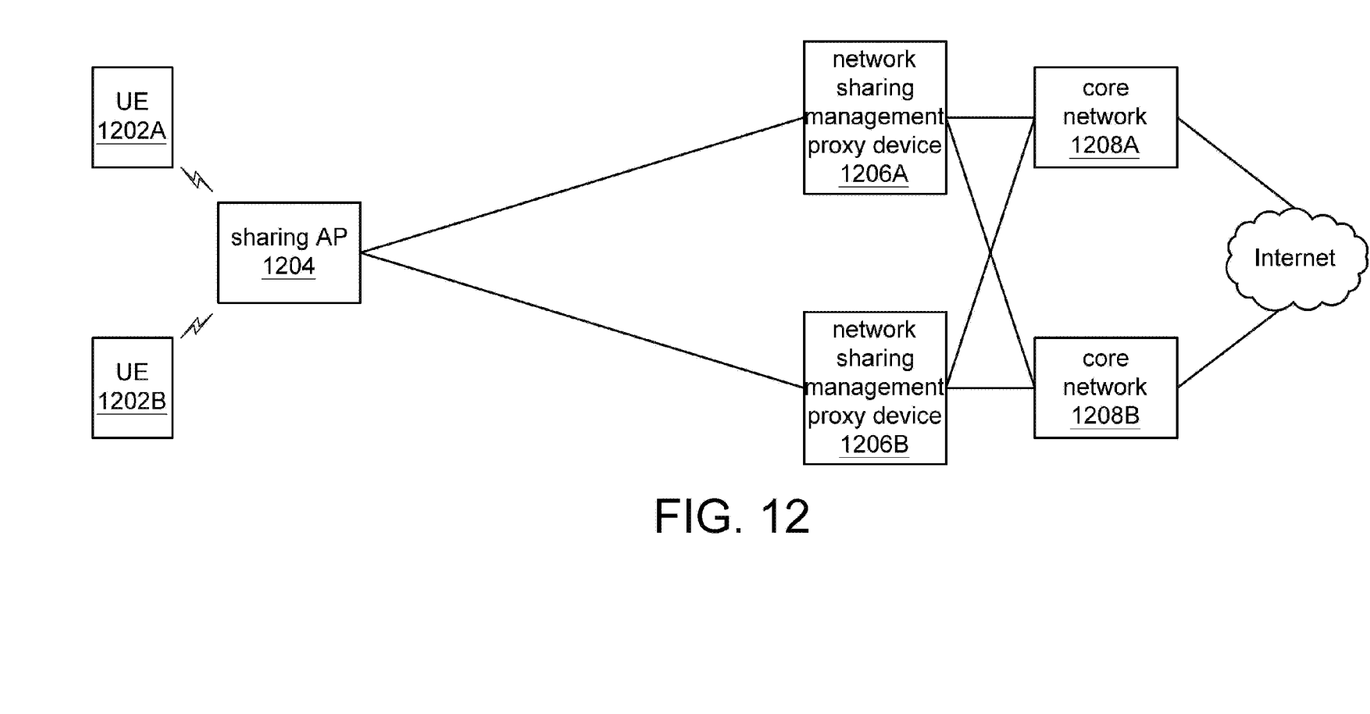

FIG. 10, FIG. 11 and FIG. 12 show schematic diagrams of various network configurations respectively corresponding to those shown in FIG. 4, FIG. 6 and FIG. 8. The main difference is that in FIG. 10 to FIG. 12, the transmission media of the backhaul is realized by wired network.

In the example of FIG. 10, the UE 1002A and UE 1002B are end UE respectively belonging to the first and second network operators. Both of the first and second network operators share the sharing AP 1004. The UE 1002A and 1002B may establish RRC connection to the sharing AP 1004. The sharing AP 1004 may connect to the network sharing management proxy device 1006 through S1 interface, and transmits the control messages from various end UE (e.g., UE 1002A, 1002B) to the network sharing management proxy device 1006. When the network sharing management proxy device 1006 receives the control messages, it will build up tunneling with the corresponding core network 1008A/1008B to ensure that the control messages finally can be transmitted to the target core network 1008A/1008B for the registration and authentication of the UE. In FIG. 10, the network sharing management proxy device is exemplified as an MME proxy device, but the present disclosure is not limited thereto.

In the example of FIG. 11, the UE 1102A and UE 1102B are end UE respectively belonging to the first and second network operators. Both of the first and second network operators share the sharing AP 1104. The UE 1102A and 1102B may establish RRC connection to the sharing AP 1104. The sharing AP 1104 may connect to the network sharing management proxy device 1106 through S1 interface, and transmits the control messages from various end UE (e.g., UE 1102A, 1102B) to the network sharing management proxy device 1106. When the network sharing management proxy device 1106 receives the control messages, it will build up tunneling with the network sharing management proxy device 1108. The network sharing management proxy device 1108 will tunnel to the related core network 1110A/1110B after extracting the control messages, to ensure that the control messages finally can be transmitted to the target core network 1110A/1110B. In FIG. 11, the network sharing management proxy device is exemplified as an MME proxy device, but the present disclosure is not limited thereto.

In the example of FIG. 12, the UE 1202A and 1202B are end UE respectively belonging to the first and second network operators. Both of the first and second network operators share the sharing AP 1204. The UE 1202A and 1202B may establish RRC connection to the sharing AP 1204 after the PLMN selection is done. The sharing AP 1204 may encapsulate the control messages into S1-MME messages and then transmit the S1-MME messages to the network sharing management proxy device 1206A/1206B. The network sharing management proxy device 1206A/1206B may build up tunneling with the related core network 1206A/1206B after extracting the control messages, to ensure that the control messages finally can be transmitted to the target core network 1208A/1208B. In FIG. 12, the network sharing management proxy device is exemplified as an MME proxy device, but the present disclosure is not limited thereto.

Based on the above, the proposed communication method and network sharing management proxy device using the same not only realizes the sharing of small cell/macro cell for multiple network operators but also makes the various network operators share their backhaul resources. Thus, the cost of deploying the small cell/macro cell for the network operators can be reduced, and the available bandwidth for the user can be improved.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for network sharing of multiple network operators, comprising:
    providing a network sharing management proxy device adapted to be disposed between a sharing access point (AP) and a plurality of core networks of the network operators, wherein the sharing AP allows one or more end user equipment (UE) of the network operators to access;
    receiving a control message by the network sharing management proxy device, wherein the control message is corresponding to a UE, and the UE is an end UE of a first network operator of the network operators;
    checking the control message to determine that the UE is corresponding to which one of the network operators, and generating tunneling information accordingly;
    encapsulating the control message into a data packet; and
    transmitting the data packet to a first core network of the first network operator according to the tunneling information.

2. The method according to claim 1, further comprising:
    receiving the control message from the sharing AP by the network sharing management proxy device; and
    transmitting the control message to a transmission media, to deliver the control message to the core networks through the transmission media.

3. The method according to claim 2, wherein the control message is sent to the first core network through at least one of the core networks in a form of data packets.

4. The method according to claim 2, further comprising:
    selecting a second core network of the core networks to transmit the control message to the first core network according to network conditions and/or routing rules.

5. The method according to claim 2, further comprising:
    establishing a first tunneling connection to another network sharing management proxy device according to the tunneling information; and
    establishing a second tunneling connection to the first core network by the other network sharing management proxy device.

6. The method according to claim 1, further comprising:
    receiving the control message from a transmission media by the network sharing management proxy device; and
    sending the control message to the first core network through at least one of the core networks.

7. The method according to claim 6, further comprising:
    selecting a second core network of the core networks to transmit the control message to the first core network according to network conditions and/or routing rules.

8. The method according to claim 1, wherein the tunneling information is corresponding to a tunnel end in the first core network, and the tunnel end is to forward the control message, in response to the tunneling information, to one or more network components for network registration and/or authentication.

9. A network sharing management proxy device for network sharing of multiple network operators, comprising:
    a receiving circuit, receiving a control message corresponding to a user equipment (UE), wherein the UE is an end UE of a first network operator of the network operators;
    a processing circuit, checking the control message to determine that the UE is corresponding to which one of the network operators, generating tunneling information accordingly, and encapsulating the control message into a data packet; and
    a transmitting circuit, transmitting the data packet to a first core network of the first network operator according to the tunneling information;
    wherein the network sharing management proxy device is adapted to be disposed between a sharing access point (AP) and a plurality of core networks of the network operators, and the sharing AP allows one or more end UE of the network operators to access.

10. The network sharing management proxy device according to claim 9, wherein the receiving circuit receives the control message from the sharing AP, and the transmitting circuit sends the control message to a transmission media to pass the control message to the core networks.

11. The network sharing management proxy device according to claim 10, wherein the control message is sent to the first core network through at least one of the core networks in a form of data packets.

12. The network sharing management proxy device according to claim 10, wherein the processing circuit selects a second core network of the core networks to transmit the control message to the first core network according to network conditions and/or routing rules.

13. The network sharing management proxy device according to claim 10, wherein the processing circuit establishes a first tunneling connection to another network sharing management proxy device according to the tunneling information, and utilizes the other network sharing management proxy device to establish a second tunneling connection to the first core network.

14. The network sharing management proxy device according to claim 9, wherein the network sharing management proxy device receives the control message from a transmission media, and sends the control message to the first core network through at least one of the core networks.

15. The network sharing management proxy device according to claim 14, wherein the processing circuit selects a second core network of the core networks to transmit the control message to the first core network according to network conditions and/or routing rules.

16. The network sharing management proxy device according to claim 9, wherein the tunneling information is corresponding to a tunnel end in the first core network, and the tunnel end is to forward the control message, in response to the tunneling information, to one or more network components for network registration and/or authentication.

* * * * *